United States Patent
Karyampudi et al.

(10) Patent No.: US 11,303,611 B1
(45) Date of Patent: Apr. 12, 2022

(54) POLICY CONSOLIDATION FOR AUTO-ORCHESTRATED DATA CENTERS

(71) Applicant: Cisco Technology, Inc., San Jose, CA (US)

(72) Inventors: Umamaheswararao Karyampudi, Fremont, CA (US); Murukanandam K. Panchalingam, Dublin, CA (US); Muralidhar Annabatula, Dublin, CA (US); Madhuryamayi Mani, Milpitas, CA (US); Darpan R. Kathoke, Milpitas, CA (US); Chong M. Tan, Saratoga, CA (US); Azeem M. Suleman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 311 days.

(21) Appl. No.: 16/525,270

(22) Filed: Jul. 29, 2019

(51) Int. Cl.
*H04L 29/06* (2006.01)

(52) U.S. Cl.
CPC ........ *H04L 63/0263* (2013.01); *H04L 63/101* (2013.01); *H04L 63/20* (2013.01)

(58) Field of Classification Search
CPC ..... H04L 63/263; H04L 63/101; H04L 63/20; H04L 63/145; H04L 63/164; H04L 63/1408
USPC .......................................................... 726/1
See application file for complete search history.

(56) References Cited

U.S. PATENT DOCUMENTS

| | | | |
|---|---|---|---|
| 9,571,502 B2 | 2/2017 | Basso et al. | |
| 9,813,420 B2 | 11/2017 | Basso et al. | |
| 10,380,344 B1* | 8/2019 | David | G06F 21/577 |
| 2013/0097660 A1 | 4/2013 | Das et al. | |
| 2015/0180908 A1 | 6/2015 | Dang et al. | |
| 2016/0183196 A1* | 6/2016 | Pitzely | H04W 52/08 370/329 |
| 2016/0357424 A1 | 12/2016 | Pang et al. | |
| 2016/0357587 A1 | 12/2016 | Yadav et al. | |
| 2016/0357957 A1 | 12/2016 | Deen et al. | |
| 2016/0359592 A1 | 12/2016 | Kulshreshtha et al. | |
| 2016/0359628 A1 | 12/2016 | Singh et al. | |
| 2016/0359658 A1 | 12/2016 | Yadav et al. | |
| 2016/0359673 A1 | 12/2016 | Gupta et al. | |
| 2016/0359678 A1 | 12/2016 | Madani et al. | |

(Continued)

FOREIGN PATENT DOCUMENTS

| | | |
|---|---|---|
| CN | 103890770 A | 6/2014 |
| CN | 107667505 A | 2/2018 |

(Continued)

*Primary Examiner* — Longbit Chai

(74) *Attorney, Agent, or Firm* — Patterson + Sheridan, LLP

(57) ABSTRACT

Techniques for generating and enforcing whitelist security policies in a communication network are disclosed. A first plurality of whitelist policies are consolidated into a second plurality of whitelist policies based on populating a plurality of tables. The populated tables include a first table including pairs of endpoints and associating each pair of endpoints with a service identifier, and a second table associating the service identifiers with the policy identifiers. The second plurality of whitelist policies are programmed into a network device in the communication network, based on at least one of the plurality of tables. Rules governing traffic between the pair of endpoints are enforced, at the network device, using the programmed second plurality of whitelist policies.

20 Claims, 22 Drawing Sheets

| FLOW # | SOURCE ENDPOINT | DESTINATION ENDPOINT | POLICY ID |
|---|---|---|---|
| FLOW-14 | EP8 | EP9 | POLICY4 |

500

| SOURCE ENDPOINT | DESTINATION ENDPOINT | SERVICE ID |
|---|---|---|
| EP1 | EP2 | 6 |
| EP1 | EP3 | 5 |
| EP4 | EP5 | 4 |
| EP6 | EP7 | 5 |
| EP8 | EP9 | 6 |
| EP10 | EP2 | 3 |

602

| POLICY ID | REFERENCE COUNT |
|---|---|
| POLICY1 | 3 |
| POLICY2 | 2 |
| POLICY4 | 4 |
| POLICY5 | 2 |
| POLICY6 | 3 |

604

| SERVICE ID | POLICY COMBINATIONS | ENDPOINTS |
|---|---|---|
| 3 | POLICY4, POLICY6 | {(EP10-EP2)} |
| 4 | POLICY1, POLICY4 | {(EP4-EP5)} |
| 5 | POLICY2, POLICY5 | {(EP1-EP3)}, {(EP6-EP7)} |
| 6 | POLICY1, POLICY4, POLICY6 | {(EP1-EP2)}, {(EP8-EP9)} |

606

(56) References Cited

U.S. PATENT DOCUMENTS

| | | |
|---|---|---|
| 2016/0359679 A1 | 12/2016 | Parandehgheibi et al. |
| 2016/0359680 A1 | 12/2016 | Parandehgheibi et al. |
| 2016/0359686 A1 | 12/2016 | Parandehgheibi et al. |
| 2016/0359696 A1 | 12/2016 | Yadav et al. |
| 2016/0359697 A1 | 12/2016 | Scheib et al. |
| 2016/0359698 A1 | 12/2016 | Deen et al. |
| 2016/0359699 A1 | 12/2016 | Gandham et al. |
| 2016/0359701 A1 | 12/2016 | Pang et al. |
| 2016/0359703 A1 | 12/2016 | Gandham et al. |
| 2016/0359704 A1 | 12/2016 | Gandham et al. |
| 2016/0359705 A1 | 12/2016 | Parandehgheibi et al. |
| 2016/0359708 A1 | 12/2016 | Gandham et al. |
| 2016/0359709 A1 | 12/2016 | Deen et al. |
| 2016/0359711 A1 | 12/2016 | Deen et al. |
| 2016/0359712 A1 | 12/2016 | Alizadeh Attar et al. |
| 2016/0359740 A1 | 12/2016 | Parandehgheibi et al. |
| 2016/0359759 A1 | 12/2016 | Singh et al. |
| 2016/0359872 A1 | 12/2016 | Yadav et al. |
| 2016/0359877 A1 | 12/2016 | Kulshreshtha et al. |
| 2016/0359878 A1 | 12/2016 | Prasad et al. |
| 2016/0359879 A1 | 12/2016 | Deen et al. |
| 2016/0359880 A1 | 12/2016 | Pang et al. |
| 2016/0359881 A1 | 12/2016 | Yadav et al. |
| 2016/0359888 A1 | 12/2016 | Gupta et al. |
| 2016/0359890 A1 | 12/2016 | Deen et al. |
| 2016/0359891 A1 | 12/2016 | Pang et al. |
| 2016/0359897 A1 | 12/2016 | Yadav et al. |
| 2016/0359912 A1 | 12/2016 | Gupta et al. |
| 2016/0359913 A1 | 12/2016 | Gupta et al. |
| 2016/0359914 A1 | 12/2016 | Deen et al. |
| 2016/0359915 A1 | 12/2016 | Gupta et al. |
| 2017/0034018 A1 | 2/2017 | Parandehgheibi et al. |
| 2017/0331780 A1 | 11/2017 | Reddy et al. |
| 2018/0270127 A1 | 9/2018 | Pang et al. |
| 2018/0270129 A1 | 9/2018 | Kulshreshtha et al. |
| 2019/0081959 A1 | 3/2019 | Yadav et al. |
| 2019/0182132 A1 | 6/2019 | Gupta et al. |
| 2019/0215253 A1 | 7/2019 | Yadav et al. |
| 2019/0253330 A1 | 8/2019 | Gandham et al. |
| 2019/0260653 A1 | 8/2019 | Yadav et al. |
| 2019/0306035 A1 | 10/2019 | Scheib et al. |

FOREIGN PATENT DOCUMENTS

| | | |
|---|---|---|
| EP | 2769327 A1 | 8/2014 |
| EP | 3304824 A1 | 4/2018 |
| EP | 3304855 A1 | 4/2018 |
| EP | 3304858 A1 | 4/2018 |
| WO | 2016196683 A1 | 12/2016 |
| WO | 2016196684 A1 | 12/2016 |

\* cited by examiner

| FLOW NUMBER | SOURCE ENDPOINT | DESTINATION ENDPOINT | POLICY ID |
|---|---|---|---|
| 1 | EP1 | EP2 | POLICY1 |
| 2 | EP1 | EP3 | POLICY2 |
| 3 | EP4 | EP5 | POLICY1 |
| 4 | EP6 | EP7 | POLICY2 |
| 5 | EP8 | EP9 | POLICY1 |
| 6 | EP10 | EP2 | POLICY4 |
| 7 | EP1 | EP2 | POLICY4 |
| 8 | EP1 | EP3 | POLICY5 |
| 9 | EP4 | EP5 | POLICY4 |
| 10 | EP6 | EP7 | POLICY5 |
| 11 | EP8 | EP9 | POLICY6 |
| 12 | EP10 | EP2 | POLICY6 |
| 13 | EP1 | EP2 | POLICY6 |
| 14 | EP8 | EP9 | POLICY4 |
| 15 | EP4 | EP5 | POLICY6 |

*FIG. 5*

POLICY CONSOLIDATION FOR AUTO-ORCHESTRATED DATA CENTERS

TECHNICAL FIELD

Embodiments presented in this disclosure generally relate to computer networking. More specifically, though not exclusively, embodiments disclosed herein relate to policy consolidation for network data centers.

BACKGROUND

Modern network data centers can include large numbers of network policies. For example, data centers can include a very large number of specific security policies governing traffic within the data center. In some circumstances, automated systems can be used to orchestrate dynamic generation of these security policies (and other network policies).

For example, data centers can include whitelist rules describing allowed network traffic within the data centers. But automated orchestration systems tend to create fine grained whitelist rules. These rules can be fine-grained to the point that they define specific allowed network traffic between specific network endpoints. The fine-grained nature of these automated policies can result in a huge number of whitelist rules on a single network node or switch.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting, other equally effective embodiments are contemplated.

FIG. 5 illustrates example whitelist policies for a network data center prior to consolidation, according to one embodiment described herein.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1:
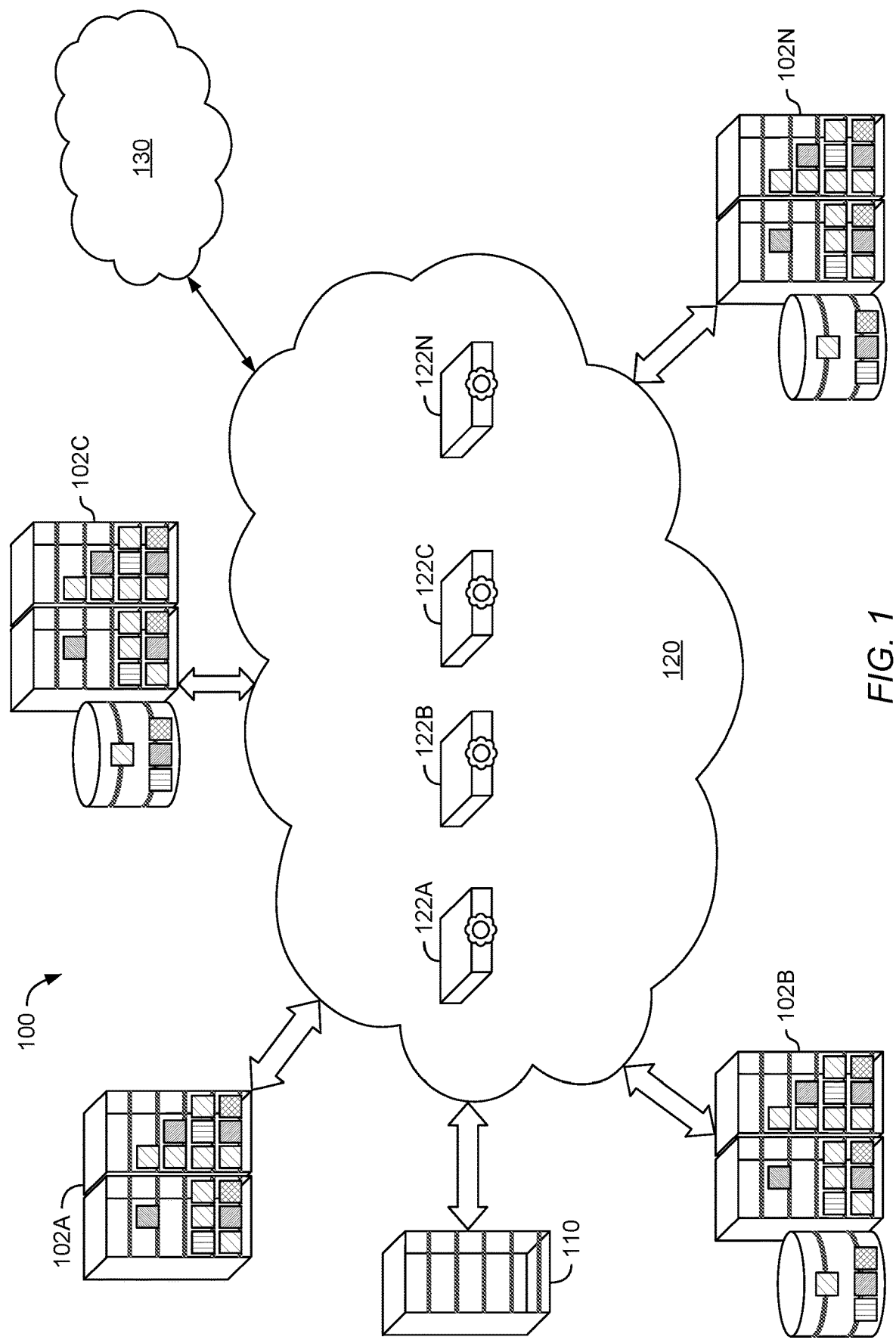
FIG. 1 illustrates a network data center with auto-orchestration of rules, according to one embodiment described herein.

Embodiments described herein include a computerized method for generating whitelist policies in a communication network. The method includes identifying a first plurality of whitelist policies for the communication network, each whitelist policy including a pair of endpoints and a policy identifier identifying a rule governing traffic between the pair of endpoints. The method further includes consolidating the first plurality of whitelist policies into a second plurality of whitelist policies based on populating a plurality of tables using the first plurality of whitelist policies. The populated tables include a first table including the pairs of endpoints and associating each pair of endpoints with a service identifier and a second table associating the service identifiers with the policy identifiers. The method further includes programming the second plurality of whitelist policies into a network device in the communication network, based on at least one of the plurality of tables. The method further includes enforcing the rules governing traffic between the pair of endpoints, at the network device, using the programmed second plurality of whitelist policies.

Embodiments described herein further include a system, including a processor and a memory containing computer program code that, when executed by the processor, performs an operation. The operation includes identifying a first plurality of whitelist policies for the communication network, each whitelist policy including a pair of endpoints and a policy identifier identifying a rule governing traffic between the pair of endpoints. The operation further includes consolidating the first plurality of whitelist policies into a second plurality of whitelist policies based on populating a plurality of tables using the first plurality of whitelist policies. The populated tables include a first table including the pairs of endpoints and associating each pair of endpoints with a service identifier and a second table associating the service identifiers with the policy identifiers. The operation further includes programming the second plurality of whitelist policies into a network device in the communication network, based on at least one of the plurality of tables. The operation further includes enforcing the rules governing traffic between the pair of endpoints, at the network device, using the programmed second plurality of whitelist policies.

Embodiments described herein further include a non-transitory computer-readable medium containing computer program code that, when executed by operation of one or more computer processors, performs an operation. The operation includes identifying a first plurality of whitelist policies for the communication network, each whitelist policy including a pair of endpoints and a policy identifier identifying a rule governing traffic between the pair of endpoints. The operation further includes consolidating the first plurality of whitelist policies into a second plurality of whitelist policies based on populating a plurality of tables using the first plurality of whitelist policies. The populated tables include a first table including the pairs of endpoints and associating each pair of endpoints with a service identifier and a second table associating the service identifiers with the policy identifiers. The operation further includes programming the second plurality of whitelist policies into a network device in the communication network, based on at least one of the plurality of tables. The operation further includes enforcing the rules governing traffic between the pair of endpoints, at the network device, using the programmed second plurality of whitelist policies.

Example Embodiments

Large numbers of whitelist rules on network nodes in data centers can result in wasted memory and compute time. This can result in too many rules to fit on a given network node, or network delays from enforcing the rules. One or more embodiments described herein relate to techniques for consolidating these rules by exploiting patterns in auto-orchestrated whitelist rules. This significantly reduces the number of rules programmed into a given network node, freeing memory and reducing switching and routing times.

For example, in some data center deployments, a service offered by a virtual machine (VM) can be utilized by thousands of clients. This can translate to thousands of identical rules between different pairs of endpoints (e.g., devices communicating using the data center network). According to one or more techniques disclosed herein, these identical rules, which differ only on the source and destination endpoints, can be consolidated into a single policy (or smaller collection of policies) that is identified by a service identifier. All endpoints using the specified service, to which the policy applies, can then be classified with the service identifier. The policy can be administered for the clients and endpoints using the service identifier.

In practice, this can result in up to an 80% reduction in the number of policies. Further, applying one or more techniques disclosed herein the number of policies used to enforce the desired rules does not depend on the number of consumers. Instead, it depends on the services and types of flows in the network (e.g., the data center).

Further, if a client VM migrates from one device to another, the associated entry can simply be removed from the service identifier mapping. In this way, the rules for a service are present on a device as long as at least one client behind the device is using the service. The rules can be removed once all clients behind the device migrate away or stop using the service.

FIG. 1 illustrates a network data center system 100 with auto-orchestration of rules, according to one embodiment described herein. For example, the network data center system 100 can implement software defined networking (SDN) principles. In an embodiment, SDN allows for a centralized, programmable network, including one or more SDN controllers. While the data center system 100 can implement SDN principles, other suitable networking techniques and paradigms may be used instead of, or in addition to, SDN.

In an embodiment, a data center 120 includes a number of endpoints 102A-N. The data center 120 further includes a number of switches 122A-N. In an embodiment, the switches 122A-N are leaf switches in a spine-and-leaf architecture (e.g., in an SDN system). Alternatively, the switches 122A-N can be any suitable network switches or other routing devices in the data center 120. In an embodiment the switches 122A-N are programmable, and route traffic between the endpoints 102A-C in the data center 120. For example, an endpoint 102A can communicate with an endpoint 102B in the data center 120 using one or more of the switches 122A-N. The data center 120 can use any suitable network communication technique, including wired connections, wireless connections, cellular connections, and any other suitable technique. Further, the data center 120 can include any suitable network, including one or more local area networks (LANs), virtual local area networks (VLANs), or other suitable networks.

As another alternative, the switches 122A-N can be virtual switches (e.g., software or firmware applications operating to switch network traffic). For example, the switches 122A-N can be virtual switches operating in a private cloud environment. As another alternative, the switches 122A-N can be virtual switches operating in a public cloud environment.

As illustrated in FIG. 1, the data center 120 further includes an orchestration server 110. In an embodiment, the orchestration server 110 provides data security and workload protection for the data center 120 through analytics of network traffic within the data center 120. For example, the orchestration server 110 can operate with the data center 120 to automatically generate whitelist security rules governing traffic within the data center. These rules can be programmed in one or more of the switches 122A-N to enforce the rules on network traffic. While embodiments disclosed herein are focused on whitelist security rules, the disclosed techniques are also suitable for other types of security rules and policies, and for non-security related rules and policies.

In an embodiment, the system 100 further includes a public cloud 130. The data center 120 can further communicate with the public cloud 130 (e.g., through one or more of the endpoints 102A-N).

Figure 2:
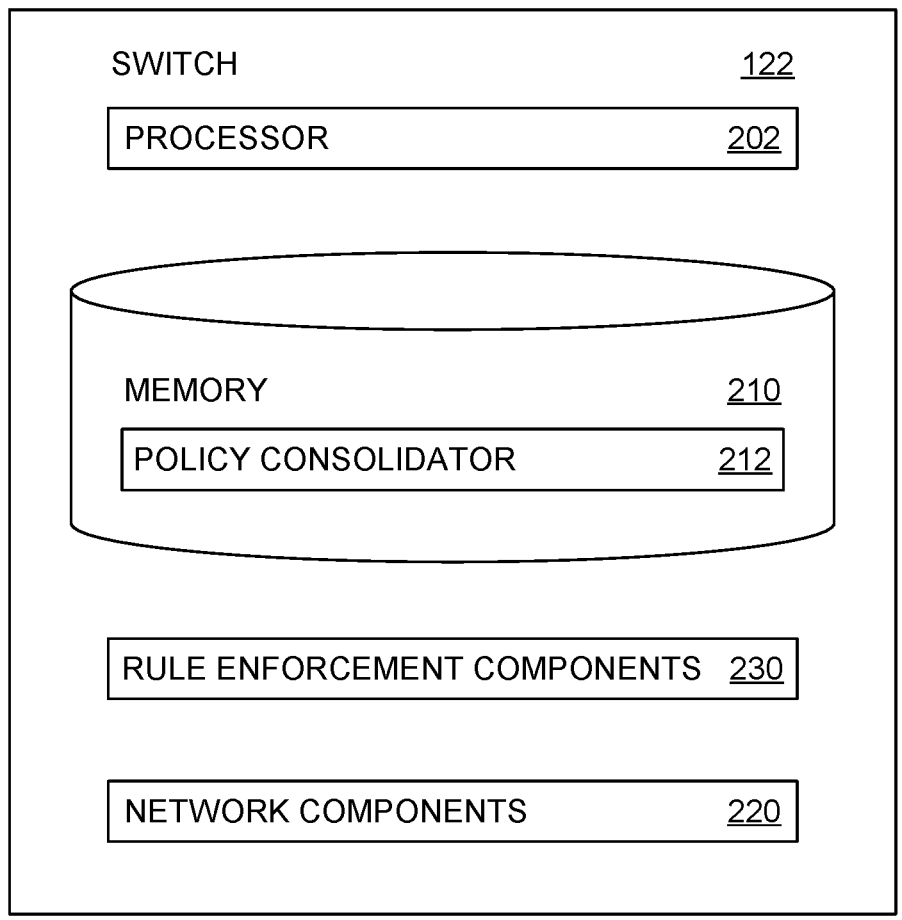
FIG. 2 illustrates a leaf switch in a network data center with auto-orchestration of rules, according to one embodiment described herein.

FIG. 2 illustrates a switch in a network data center with auto-orchestration of rules, according to one embodiment described herein. In an embodiment, the switch 122 in FIG. 2 corresponds with one of the switches 122A-N illustrated in FIG. 1. As discussed above, in an embodiment the switch 122 is a programmable leaf switch in a leaf-spine architecture. The switch 122 includes a processor 202, a memory 210, network components 220, and rule enforcement components 230. The processor 202 generally retrieves and executes programming instructions stored in the memory 210. The processor 202 is included to be representative of a single central processing unit (CPU), multiple CPUs, a single CPU having multiple processing cores, graphics processing units (GPUs) having multiple execution paths, and the like. Alternatively, while in one embodiment the switch 122 is a hardware switch, as discussed above in another embodiment the switch 122 is a virtual switch.

The network components 220 include the components necessary for the switch 122 to interface with a communication network (e.g., in the data center 120 illustrated in FIG. 1). For example, the network components 220 can include network interface components and associated software. Although the memory 210 is shown as a single entity, the memory 210 may include one or more memory devices having blocks of memory associated with physical addresses, such as random access memory (RAM), read only memory (ROM), flash memory or other types of volatile and/or non-volatile memory. In an embodiment, the memory 210 can include all, or a portion, ternary content-addressable memory (TCAM).

The memory 210 generally includes program code for performing various functions related to use of the switch 122. The program code is generally described as various functional "applications" or "modules" within the memory 210, although alternate implementations may have different functions and/or combinations of functions. Within the memory 210, the policy consolidator module 212 consolidates policies (e.g., whitelist policies), as described in relation to FIGS. 3-7 The switch 122 further includes rule enforcement components 230. In an embodiment, the rule enforcement components 230 include hardware components to enforce policy rules on network traffic flowing through the switch 122. For example, the rule enforcement components 230 can include programmable memory (e.g., TCAM) into which the rules can be programmed.

Figure 3:
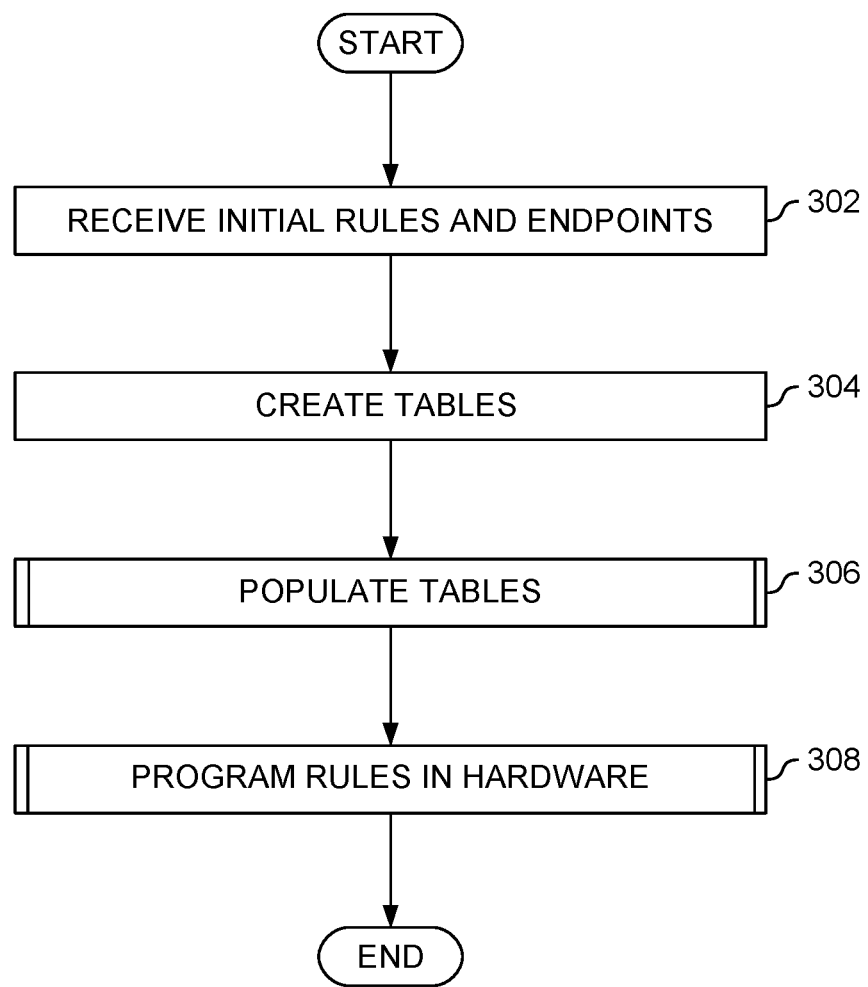
FIG. 3 is a flowchart illustrating consolidation of whitelist policies for a network data center with auto-orchestration of rules, according to one embodiment described herein.

FIG. 3 is a flowchart illustrating consolidation of whitelist policies for a network data center with auto-orchestration of rules, according to one embodiment described herein. At block 302 a switch (e.g., the switch 122 illustrated in FIG. 2) receives the initial collection of rules and endpoints. In an embodiment, this collection identifies the source endpoint, the destination endpoint, and the policy to apply for that pairing. For example, collection 500 illustrated in FIG. 5 is one example of a collection of initial rules and endpoints. This format, however, is merely one example of a collection of rules and endpoints. Any suitable format can be used. Further, while FIG. 3 is discussed in the context of using a switch for policy consolidation, in alternative embodiments other hardware and software components (e.g., other network devices or servers) can be used.

At block 304, a policy consolidator (e.g., the policy consolidator 212 illustrated in FIG. 2) creates tables for use in policy consolidation. In an embodiment, the policy consolidator creates three tables in software. A first software table identifying source and destination pairs with a service identifier (e.g., the table 602 illustrated in FIGS. 6A-O), a second software table identifying different policies with identifiers (e.g., the table 604 illustrated in FIGS. 6A-O), and a third software table identifying different policy combinations for different endpoint pairs (e.g., the table 606 illustrated in FIGS. 6A-O).

At block 306, the policy consolidator populates the tables using the collection of rules and endpoints. This is discussed further with regard to FIGS. 4-6. At block 308, the policy consolidator programs the switch hardware (e.g., the rule enforcement components 230 illustrated in FIG. 2) with rules using the populated tables. This is discussed further with regard to FIGS. 7-8. While this block is discussed in terms of hardware enforcement, as discussed above in an embodiment the rules are programmed into memory for use by software (e.g., in a virtual switch).

Figure 4:
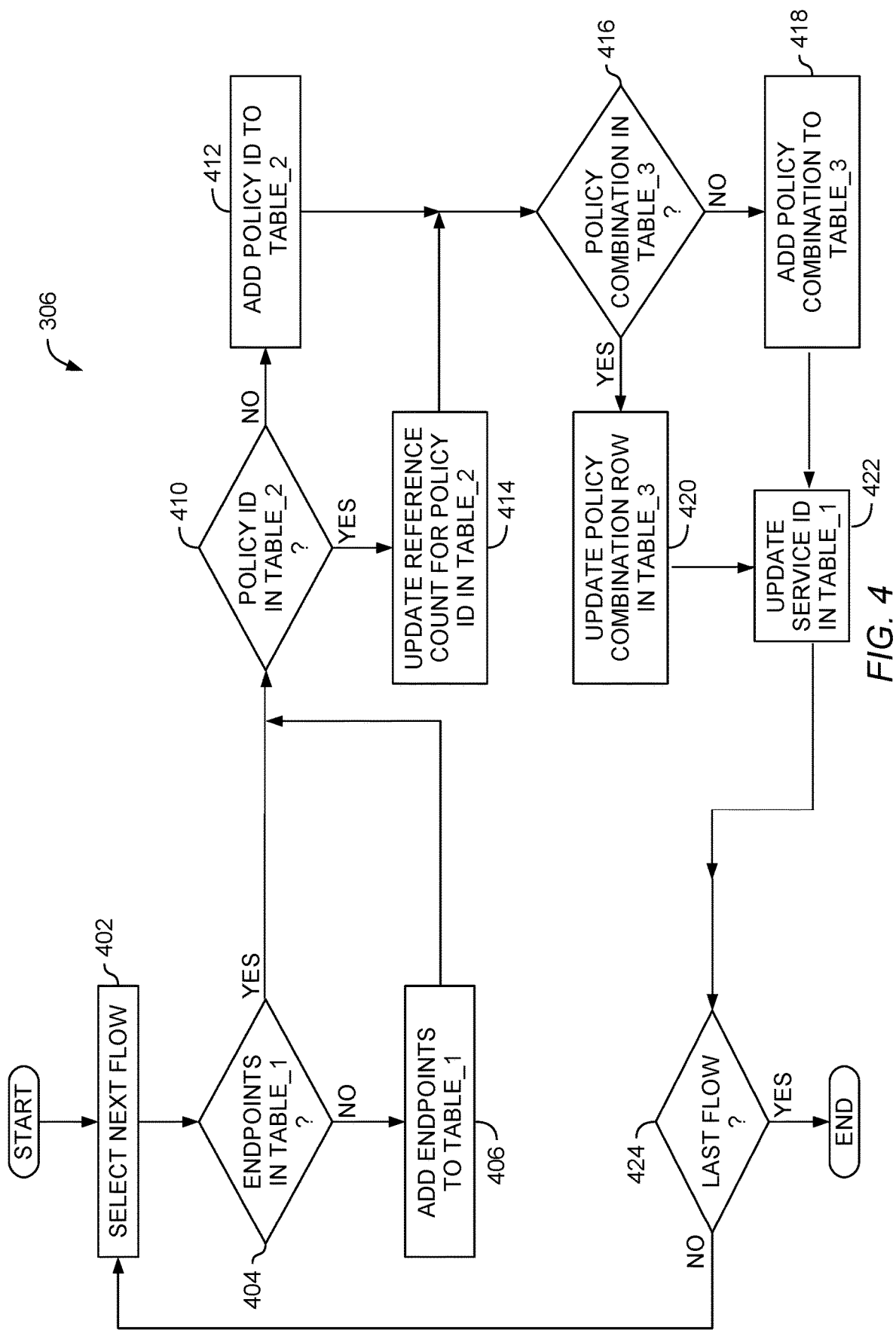
FIG. 4 is a flowchart further illustrating consolidation of whitelist policies for a network data center with auto-orchestration of rules, according to one embodiment described herein.
Figure 6A:
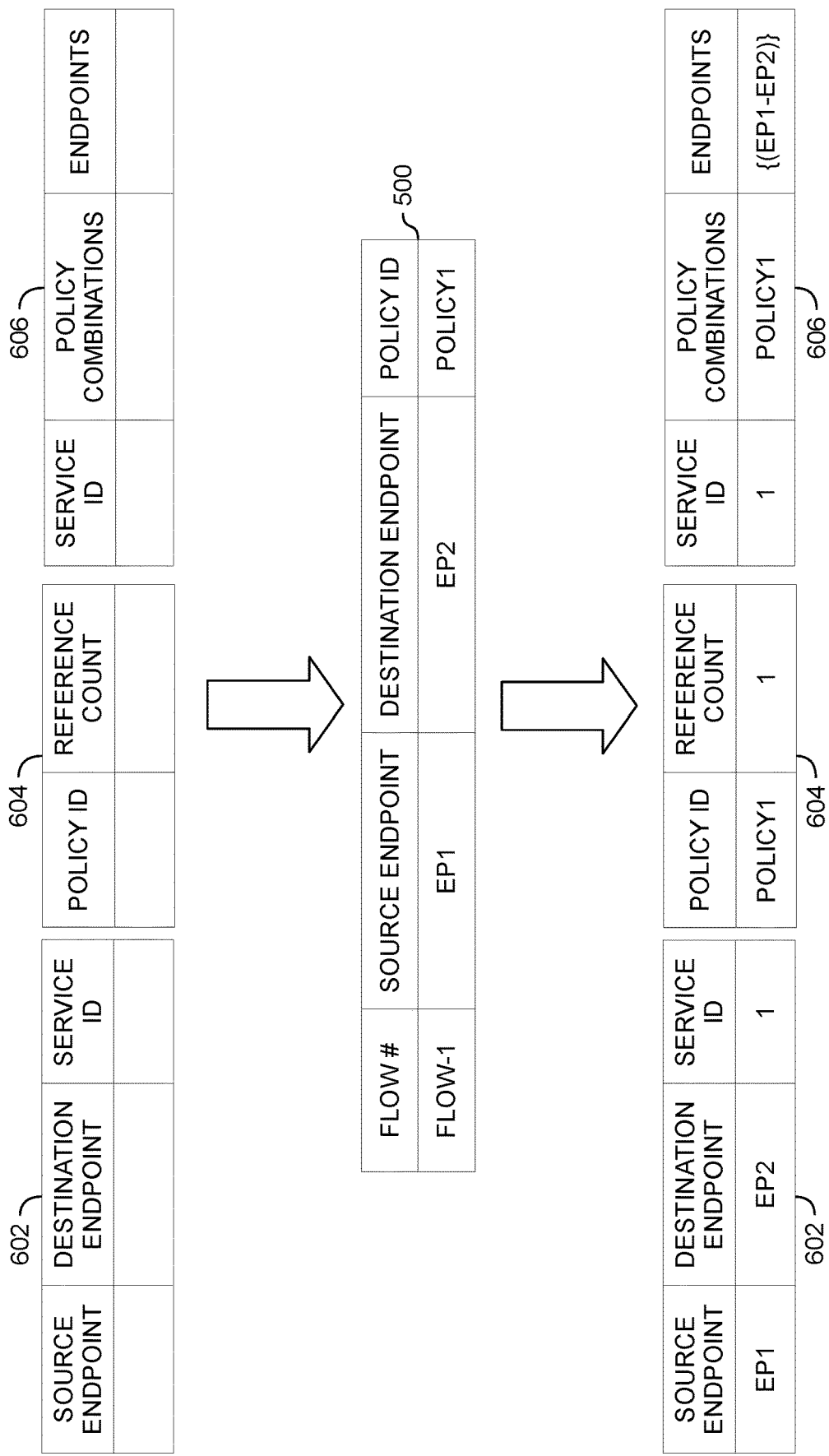
FIGS. 6A-6O illustrate consolidation of the whitelist policies for a network data center illustrated in FIG. 5, according to one embodiment described herein.

FIG. 4 is a flowchart further illustrating consolidation of whitelist policies for a network data center with auto-orchestration of rules, according to one embodiment described herein. FIG. 5 illustrates example whitelist policies 500 for a network data center prior to consolidation, according to one embodiment described herein. FIGS. 6A-6O illustrate consolidation of the whitelist policies for a network data center illustrated in FIG. 5, according to one embodiment described herein. FIGS. 4-6 will be discussed together.

In an embodiment, FIG. 4 illustrates an example flowchart used for consolidation of the whitelist rules illustrated in FIG. 5. For example, FIG. 5 includes 15 flows, each of which identifies a source endpoint, a destination endpoint, and a policy identifier identifying a rule to apply to traffic from the source endpoint to the destination endpoint. In an embodiment, each policy identifier identifies a rule for governing traffic between the endpoints (e.g., a rule stored elsewhere and identified using the policy identifier). Any suitable rule can be used, including rules relating to protocols, source ports, destination ports, differentiated services code point (DSCP), flags, directions, actions, etc.

Without consolidation, all fifteen of these flows would be programmed into the rule enforcement components (e.g., the rule enforcement components 230 of the switch 122 illustrated in FIG. 2). Instead, the flows are consolidated into 7 entries for programming into the rule enforcement component. FIGS. 6A-O illustrate populating tables with the whitelist rules illustrated in FIG. 5, as the flowchart illustrated in FIG. 4 progresses.

At block 402, a policy consolidator (e.g., policy consolidator 212 illustrated in FIG. 2) selects the next flow. For example, as illustrated in FIG. 6A, the policy consolidator selects Flow-1, with endpoints EP1 and EP2 and policy identifier Policy1. At block 404, the policy consolidator determines whether the endpoints in the selected flow are already in Table_1. In an embodiment, Table_1 in FIG. 4 corresponds with the table 602 illustrated in FIGS. 6A-O, Table_2 in FIG. 4 corresponds with the table 604 illustrated in FIGS. 6A-O, and Table_3 in FIG. 4 corresponds with the table 606 illustrated in FIGS. 6A-O.

As illustrated in FIG. 6A, the tables 602, 604, and 606 are initially empty. Therefore, at block 404, the policy consolidator determines that the endpoints in Flow-1 are not in the table 602. The flowchart then proceeds to block 406, and the endpoints from Flow-1 are added to Table_1. This is shown in FIG. 6A, where the endpoints EP1 and EP2 are added to the table 602 with a service ID 1.

At block 410, the policy consolidator determines whether the policy identifier is already in Table_2 (e.g., table 604 illustrated in FIG. 6A). As illustrated in FIG. 6A, the table 604 is initially empty. Thus, the flowchart proceeds to block 412 and adds the policy to Table_2. In the example of FIG. 6A, the policy consolidator adds the policy Policy1 to the table 604, with a reference count of 1. In an embodiment, the policy identifier Policy1 is assigned to this policy prior to policy consolidation (e.g., during rule creation or at another suitable time). Alternatively, the policy identifier Policy1 can be assigned, or changed, during consolidation.

At block 416, the policy consolidator determines whether the policy combination is already in Table_3. The table 606 in FIG. 6A is initially empty, so the flowchart proceeds to block 418 and the policy consolidator adds the policy combination to Table_3. In the example of FIG. 6A, the policy consolidator adds the policy combination Policy1 (e.g., Policy1 alone) to the table 606 in a row with service ID 1 and endpoints (EP1-EP2).

At block 422, the policy consolidator updates the service ID associated with the endpoints in the table 602, if necessary, based on the service ID used in the table 606. At block 424, the policy consolidator determines whether this is the last flow in the list of whitelist policies. It is not, so the flowchart returns to block 402 and selects the next flow.

Figure 6B:
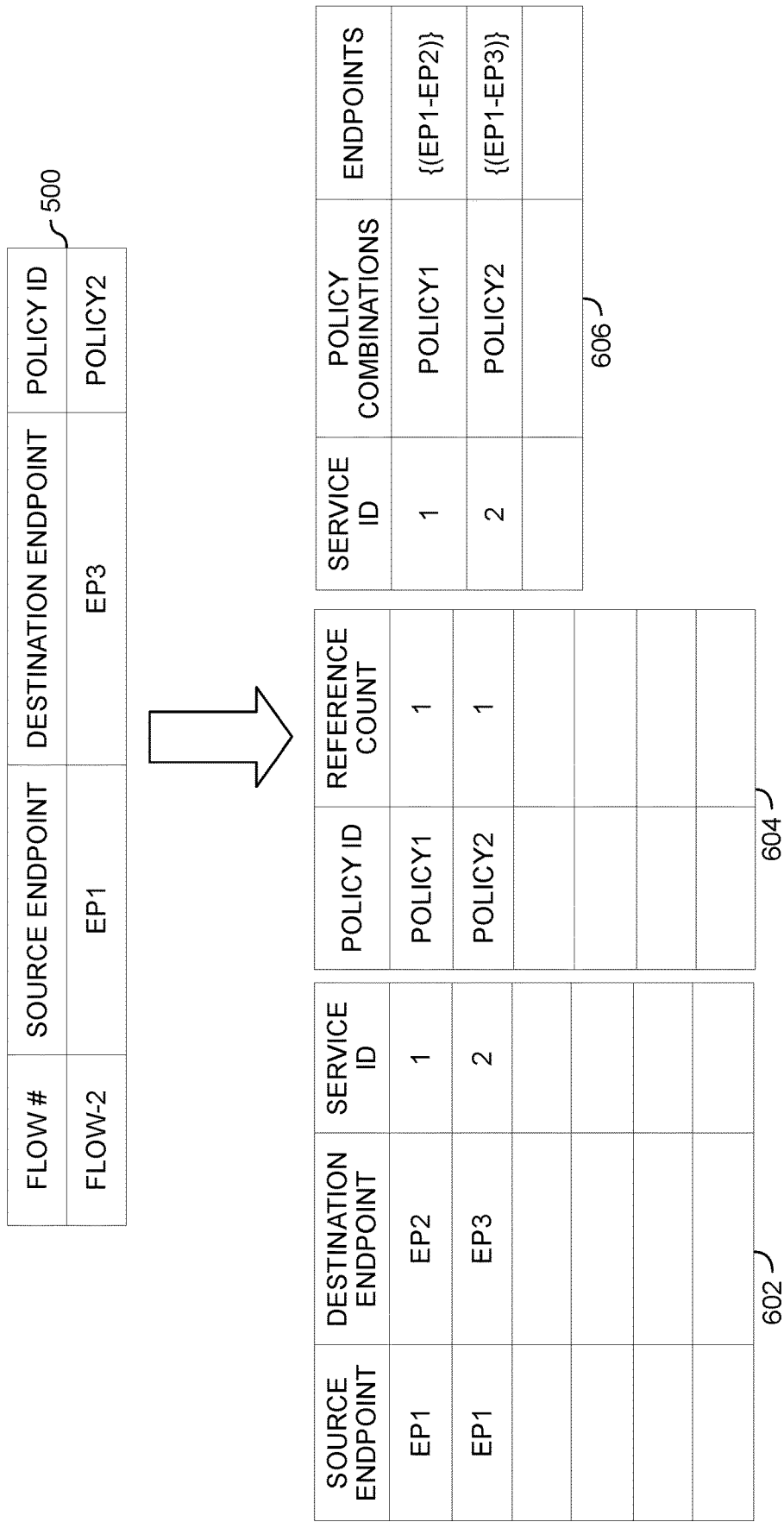

This is illustrated in FIG. 6B: Flow-2, with source endpoint EP1, destination endpoint EP3, and policy identifier Policy2. At block 404, the policy consolidator determines that the endpoints in Flow-2 (e.g., EP1-EP3) are not in the table 602. The flowchart proceeds to block 406, and adds these endpoints to the table 602, as illustrated in FIG. 6B. This row is assigned the service ID 2.

At block 410, the policy consolidator determines whether the policy identifier is already in Table_2 (e.g., table 604 illustrated in FIG. 6B). As illustrated in FIG. 6B, policy2 is not in the table 604. The flowchart proceeds to block 412 and the policy consolidator adds policy2 to the table 604.

At block 416, the policy consolidator determines whether the policy combination is already in Table_3. Policy2 is not in the table 606, so the flowchart proceeds to block 418 and adds the policy combination to Table_3. In the example of FIG. 6B, the policy consolidator adds the policy combination Policy2 (e.g., Policy2 alone) to the table 606 in a row with service ID 2 and endpoints (EP1-EP3). At block 422, the policy consolidator updates the service ID associated with the endpoints in the table 602, if necessary, based on the service ID used in the table 606. Flow-2 is again not the last flow, so the policy consolidator returns to block 402 and selects the next flow.

Figure 6C:
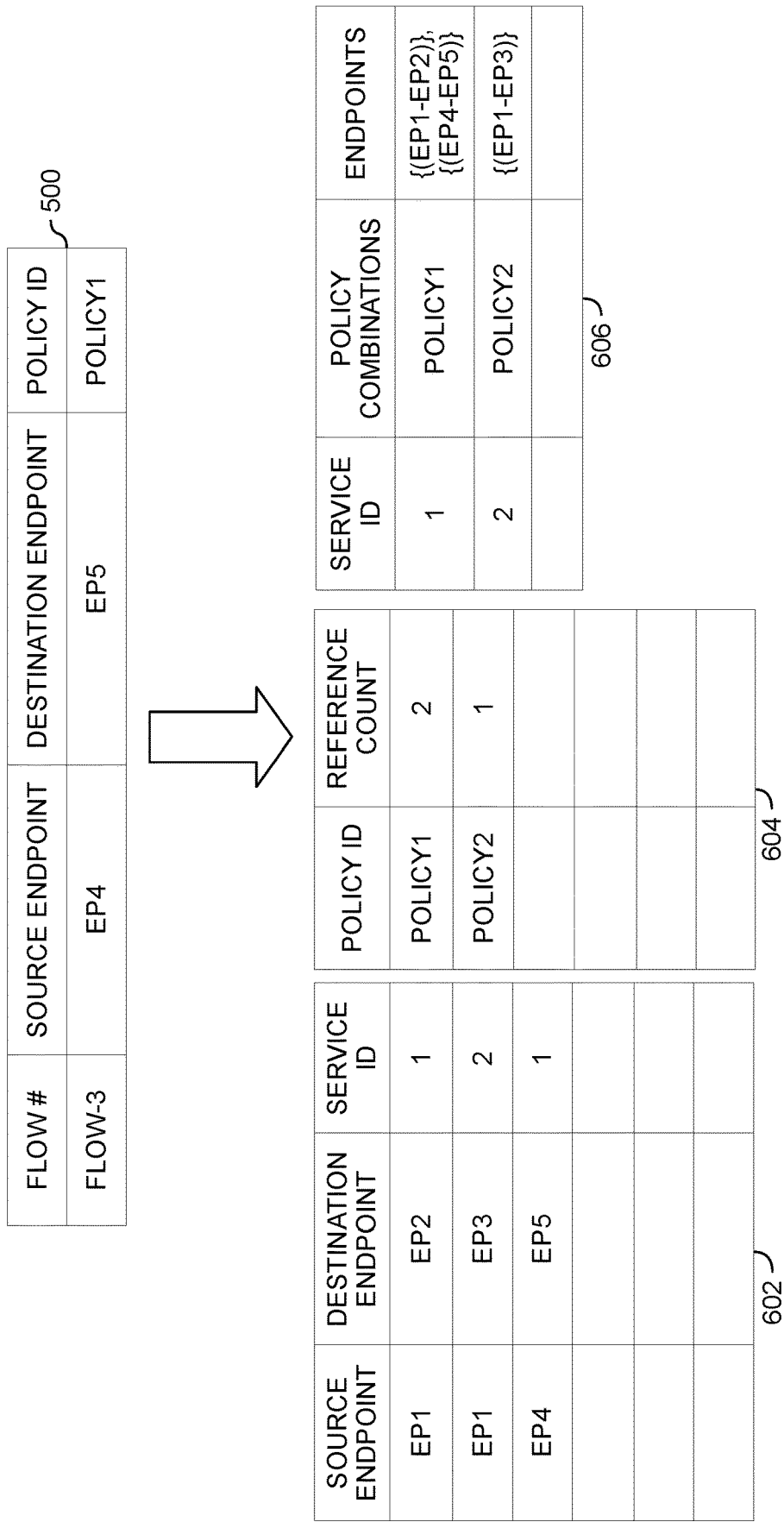

FIG. 6C illustrates this next flow: Flow-3, with source endpoint EP4, destination endpoint EP5, and policy identifier Policy1. At block 404, the policy consolidator determines that the endpoints in Flow-3 (e.g., EP4-EP5) are not in the table 602. The flowchart proceeds to block 406, and adds these endpoints to the table 602, as illustrated in FIG. 6C. This endpoint combination is associated with policy1, so the endpoints EP4-EP5 are assigned the service ID already associated with policy1 in the table 606: service ID 1.

At block 410, the policy consolidator determines whether the policy identifier is already in Table_2 (e.g., table 604 illustrated in FIG. 6C). As illustrated in FIG. 6C, policy1 is in the table 604, so the flowchart proceeds to block 414. At block 414, the policy consolidator updates the reference count for policy1 from 1 to 2.

At block 416, the policy consolidator determines whether the policy combination is already in Table_3. Policy1 is in the table 606, so the flowchart proceeds to block 420. At block 420, the policy consolidator updates the row associated with policy1 (and service ID 1) to include the endpoints (EP4-EP5). At block 422, the policy consolidator updates the service ID associated with the endpoints in the table 602, if necessary, based on the service ID used in the table 606. Flow-3 is again not the last flow, so the policy consolidator returns to block 402 and selects the next flow.

Figure 6D:
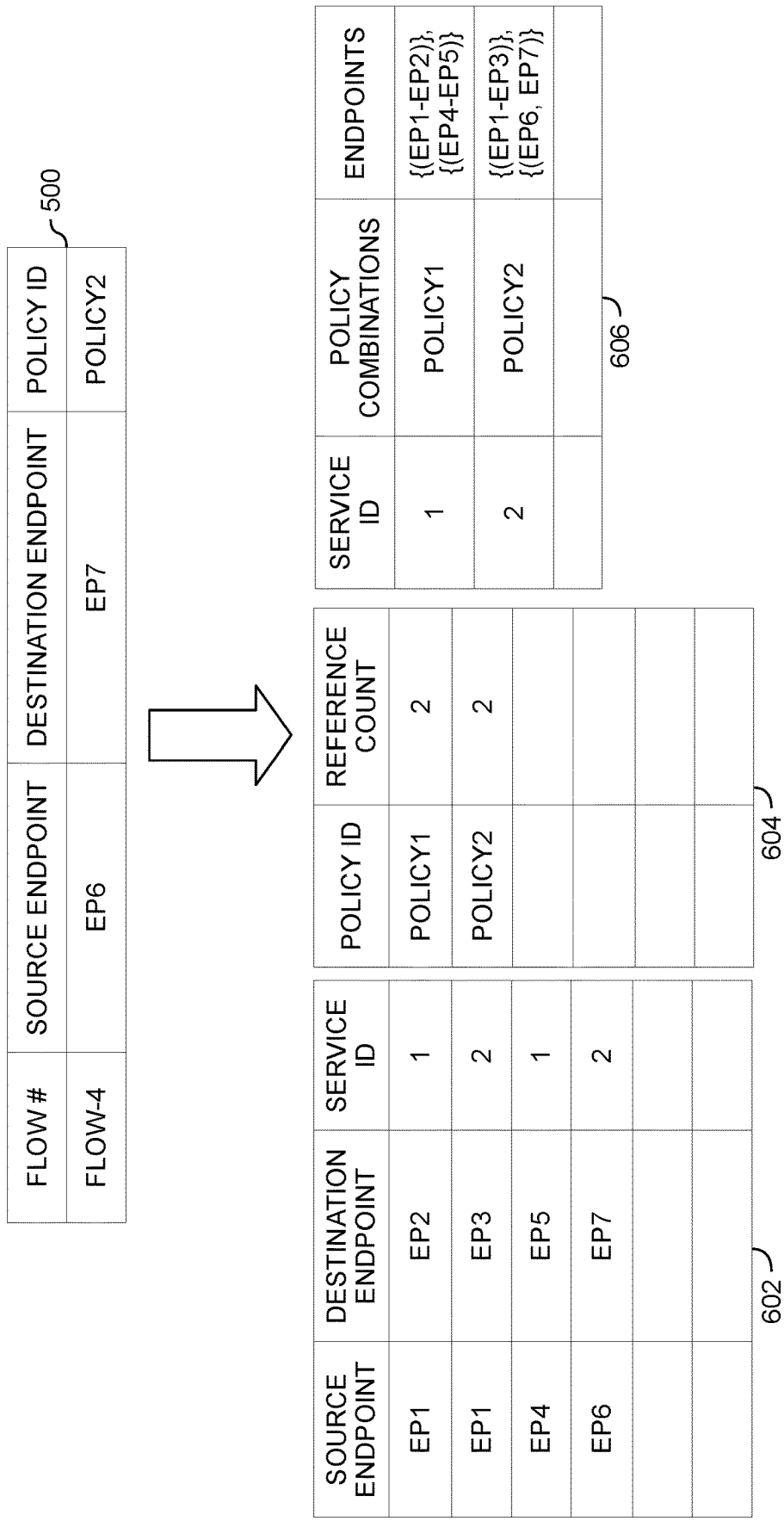

FIG. 6D illustrates this next flow: Flow-4, with source endpoint EP6, destination endpoint EP7, and policy identifier Policy2. At block 404, the policy consolidator determines that the endpoints in Flow-4 (e.g., EP6-EP7) are not in the table 602. The flowchart proceeds to block 406, and adds these endpoints to the table 602, as illustrated in FIG. 6D. This endpoint combination is associated with policy2, so the endpoints EP6-EP7 are assigned the service ID already associated with policy2 in the table 606: service ID 2.

At block 410, the policy consolidator determines whether the policy identifier is already in Table_2 (e.g., table 604 illustrated in FIG. 6D). As illustrated in FIG. 6D, policy2 is in the table 604, so the flowchart proceeds to block 414. At block 414, the policy consolidator updates the reference count for policy2 from 1 to 2.

At block 416, the policy consolidator determines whether the policy combination is already in Table_3. Policy2 is in the table 606, so the flowchart proceeds to block 420. At block 420, the policy consolidator updates the row associated with policy2 (and service ID 2) to include the endpoints (EP6-EP7). At block 422, the policy consolidator updates the service ID associated with the endpoints in the table 602, if necessary, based on the service ID used in the table 606. Flow-4 is again not the last flow, so the policy consolidator returns to block 402 and selects the next flow.

Figure 6E:
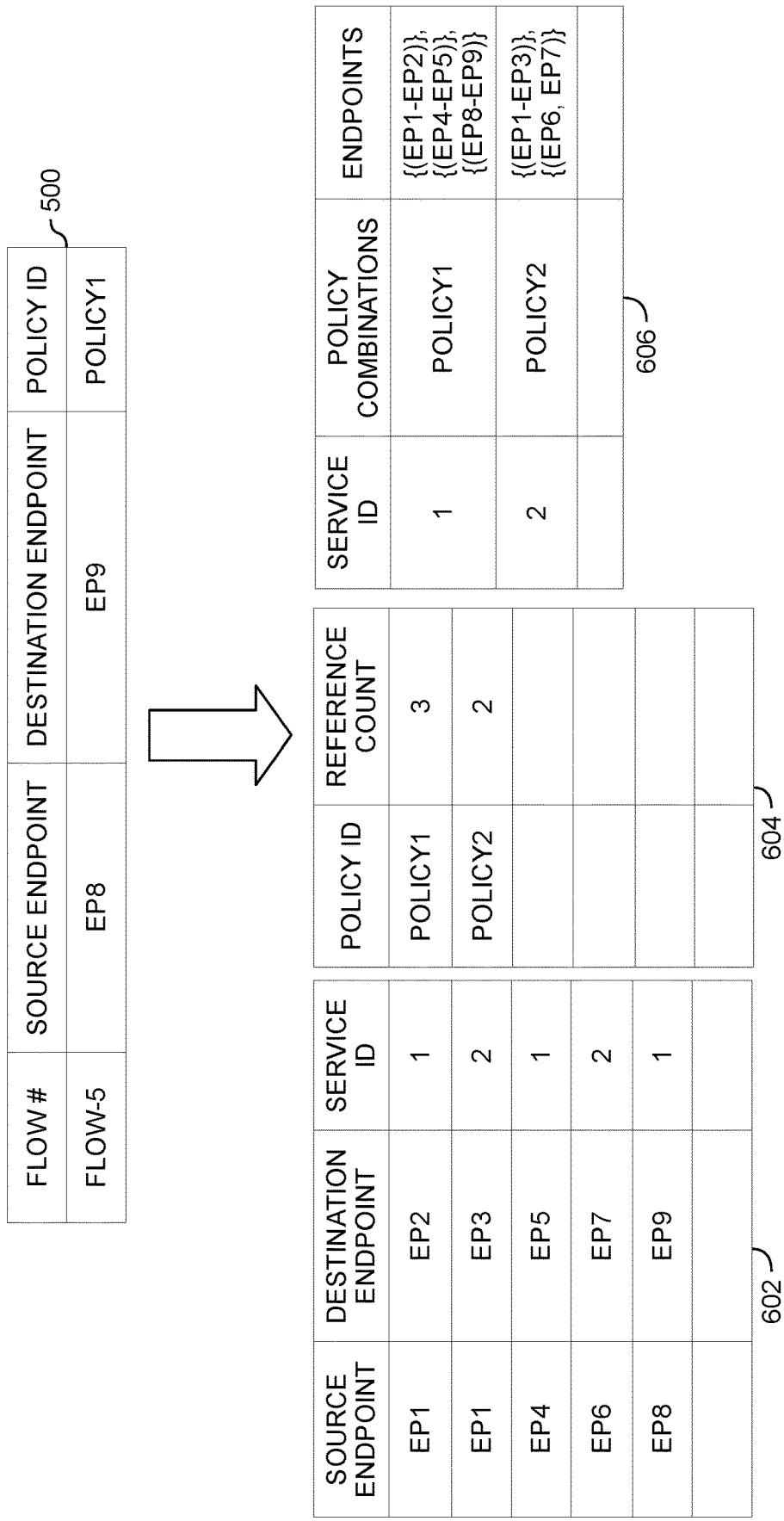

FIG. 6E illustrates this next flow: Flow-5, with source endpoint EP8, destination endpoint EP9, and policy identifier Policy1. At block 404, the policy consolidator determines that the endpoints in Flow-5 (e.g., EP8-EP9) are not in the table 602. The flowchart proceeds to block 406, and adds these endpoints to the table 602, as illustrated in FIG. 6E. This endpoint combination is associated with policy1, so the endpoints EP8-EP9 are assigned the service ID already associated with policy1 in the table 606: service ID 1.

At block 410, the policy consolidator determines whether the policy identifier is already in Table_2 (e.g., table 604 illustrated in FIG. 6E). As illustrated in FIG. 6E, policy1 is in the table 604, so the flowchart proceeds to block 414. At block 414, the policy consolidator updates the reference count for policy1 from 2 to 3.

At block 416, the policy consolidator determines whether the policy combination is already in Table_3. Policy1 is in the table 606, so the flowchart proceeds to block 420. At block 420, the policy consolidator updates the row associated with policy1 (and service ID 1) to include the endpoints (EP8-EP9). At block 422, the policy consolidator updates the service ID associated with the endpoints in the table 602, if necessary, based on the service ID used in the table 606. Flow-5 is again not the last flow, so the policy consolidator returns to block 402 and selects the next flow.

Figure 6F:
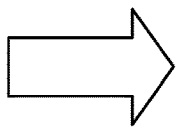

FIG. 6F illustrates this next flow: Flow-6, with source endpoint EP10, destination endpoint EP2, and policy identifier Policy4. At block 404, the policy consolidator determines that the endpoints in Flow-6 (e.g., EP10-EP2) are not in the table 602. The flowchart proceeds to block 406, and adds these endpoints to the table 602, as illustrated in FIG. 6F. These endpoints are assigned service ID 3 because policy4 has not yet been added to the table 606.

At block 410, the policy consolidator determines whether the policy identifier is already in Table_2 (e.g., table 604 illustrated in FIG. 6F). As illustrated in FIG. 6F, policy4 is not in the table 604, so the flowchart proceeds to block 412. At block 412, the policy consolidator add policy4 to the table 604, with a reference count of 1.

At block 416, the policy consolidator determines whether the policy combination is already in Table_3. Policy4 is not in the table 606, so the flowchart proceeds to block 418. At block 418, the policy consolidator adds a row with service ID 3, policy4, and endpoints (EP10-EP2) to the table 606. At block 422, the policy consolidator updates the service ID associated with the endpoints in the table 602, if necessary, based on the service ID used in the table 606. Flow-6 is again not the last flow, so the policy consolidator returns to block 402 and selects the next flow.

Figure 6G:
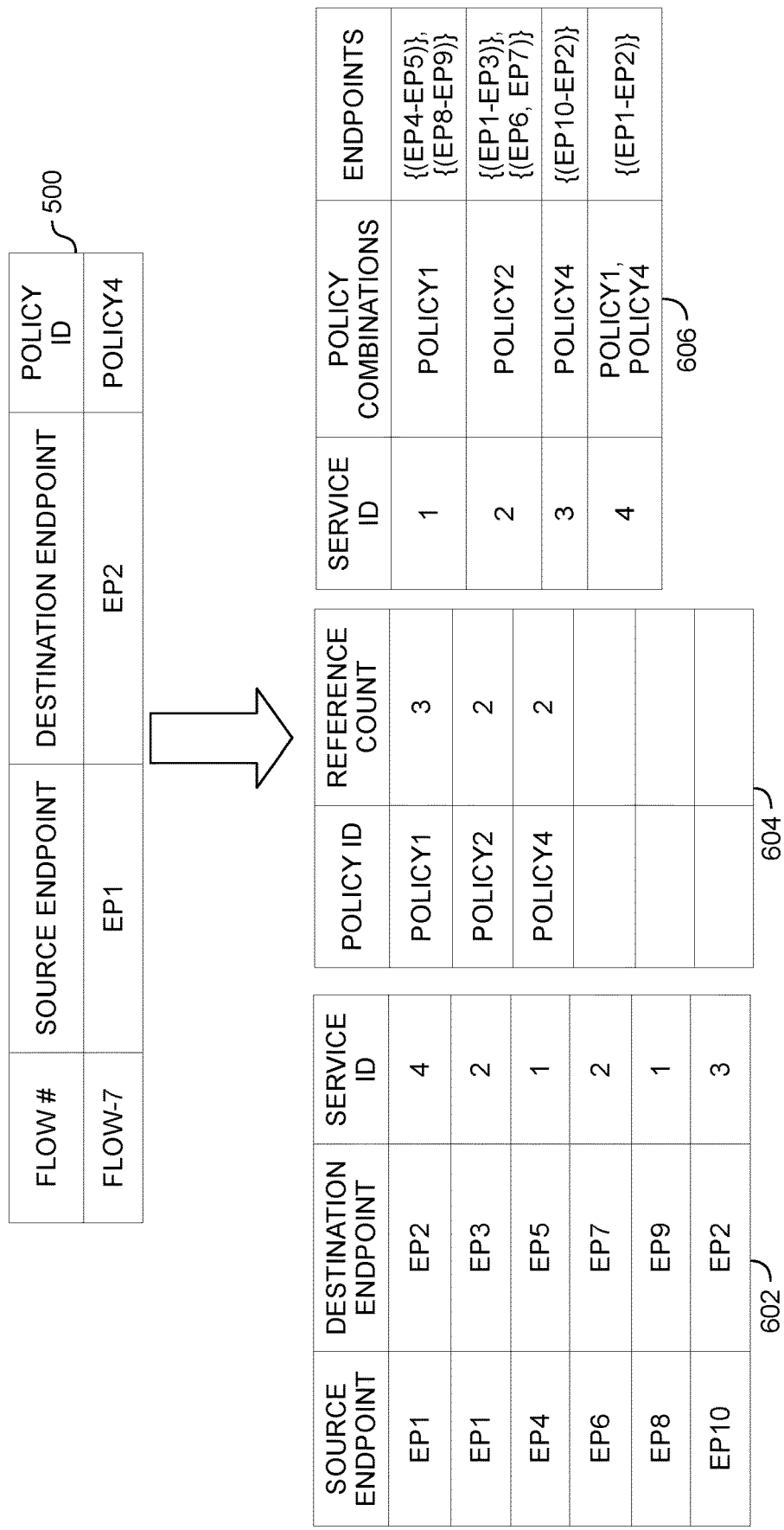

FIG. 6G illustrates this next flow: Flow-7, with source endpoint EP1, destination endpoint EP2, and policy identifier Policy4. At block 404, the policy consolidator determines that the endpoints in Flow-7 (e.g., EP1-EP2) are in the table 602, so the flowchart proceeds to block 410.

At block 410, the policy consolidator determines whether the policy identifier is already in Table_2 (e.g., table 604 illustrated in FIG. 6G). As illustrated in FIG. 6G, policy4 is in the table 604, so the flowchart proceeds to block 414. At block 414, the policy consolidator updates the reference count associated with policy4 from 1 to 2.

At block 416, the policy consolidator determines whether the policy combination is already in Table_3. The policy combination (policy1, policy4) is not in the table 606, so the flowchart proceeds to block 418. At block 418, the policy consolidator adds a row with service ID 4, policy combination (policy1, policy4), and endpoints (EP1-EP2) to the table 606. Of note, in an embodiment, each endpoint pairing is associated with only one service ID and one policy combination. Endpoint pair (EP1-EP2) is associated with both policy1 and policy4. So the policy consolidator removes endpoints (EP1-EP2) from the row in the table 606 associated with just policy1 (and service ID 1) when it adds endpoints (EP1-EP2) to the row associated with both policy1 and policy4 (and service ID 4). At block 422, the policy consolidator updates the service ID associated with the endpoints in the table 602, if necessary, based on the service ID used in the table 606. Flow-7 is again not the last flow, so the policy consolidator returns to block 402 and selects the next flow.

Figure 6H:
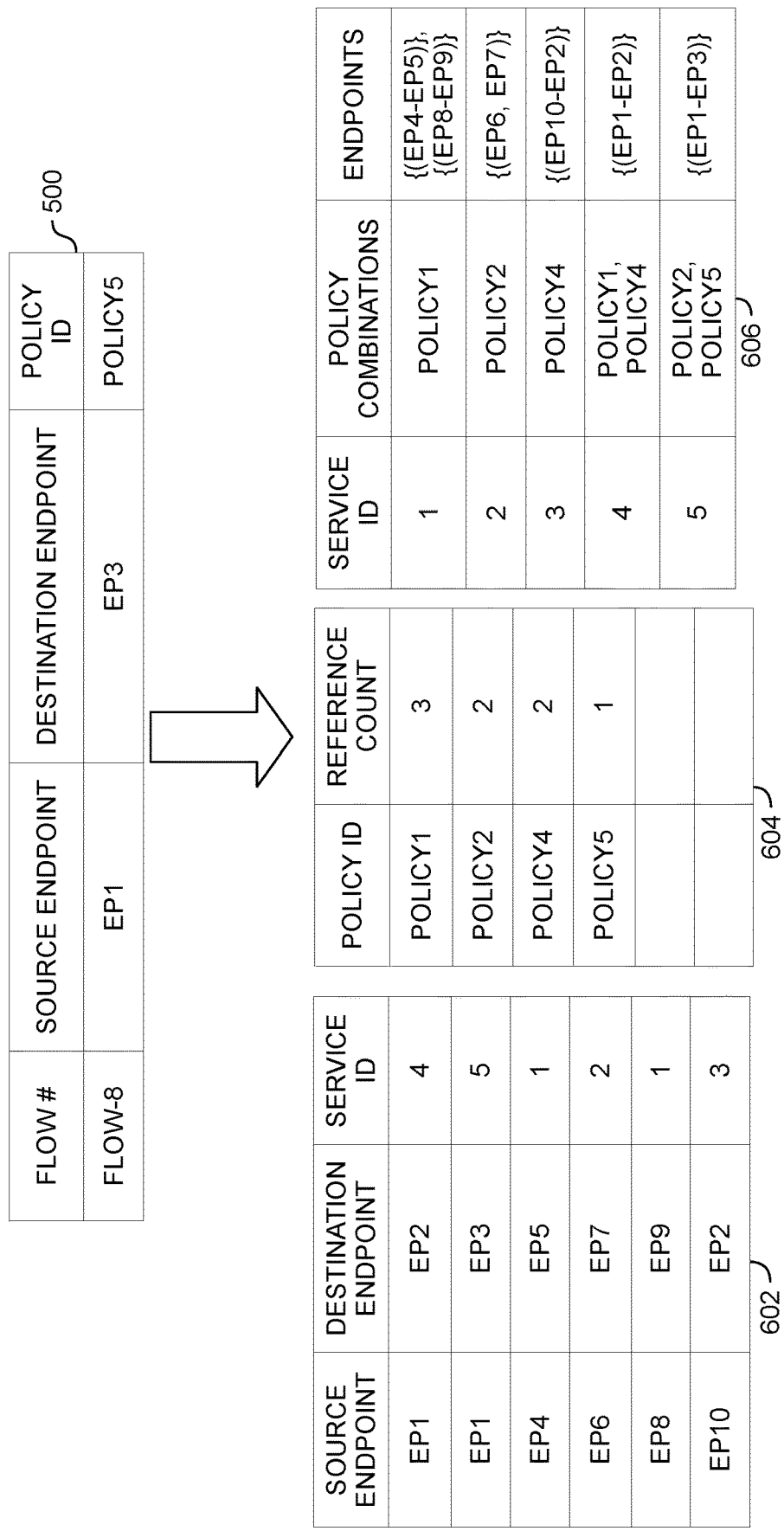

FIG. 6H illustrates this next flow: Flow-8, with source endpoint EP1, destination endpoint EP3, and policy identifier Policy5. At block 404, the policy consolidator determines that the endpoints in Flow-8 (e.g., EP1-EP3) are in the table 602, so the flowchart proceeds to block 410.

At block 410, the policy consolidator determines whether the policy identifier is already in Table_2 (e.g., table 604 illustrated in FIG. 6H). As illustrated in FIG. 6H, policy5 is not in the table 604. So the flowchart proceeds to block 412. At block 412, the policy consolidator adds policy5 to the table 604 with a reference count of 1.

At block 416, the policy consolidator determines whether the policy combination is already in Table_3. The policy combination (policy2, policy5) is not in the table 606, so the flowchart proceeds to block 418. At block 418, the policy consolidator adds a row with service ID 5, policy combination (policy2, policy5), and endpoints (EP1-EP3) to the table 606. Endpoint pair (EP1-EP3) is associated with both policy2 and policy5. So the policy consolidator removes endpoints (EP1-EP3) from the row in the table 606 associated with just policy2 (and service ID 2) when it adds endpoints (EP1-EP3) to the row associated with both policy2 and policy5 (and service ID 5). At block 422, the policy consolidator updates the service ID associated with the endpoints in the table 602, if necessary, based on the service ID used in the table 606. Flow-8 is again not the last flow, so the policy consolidator returns to block 402 and selects the next flow.

Figure 6I:
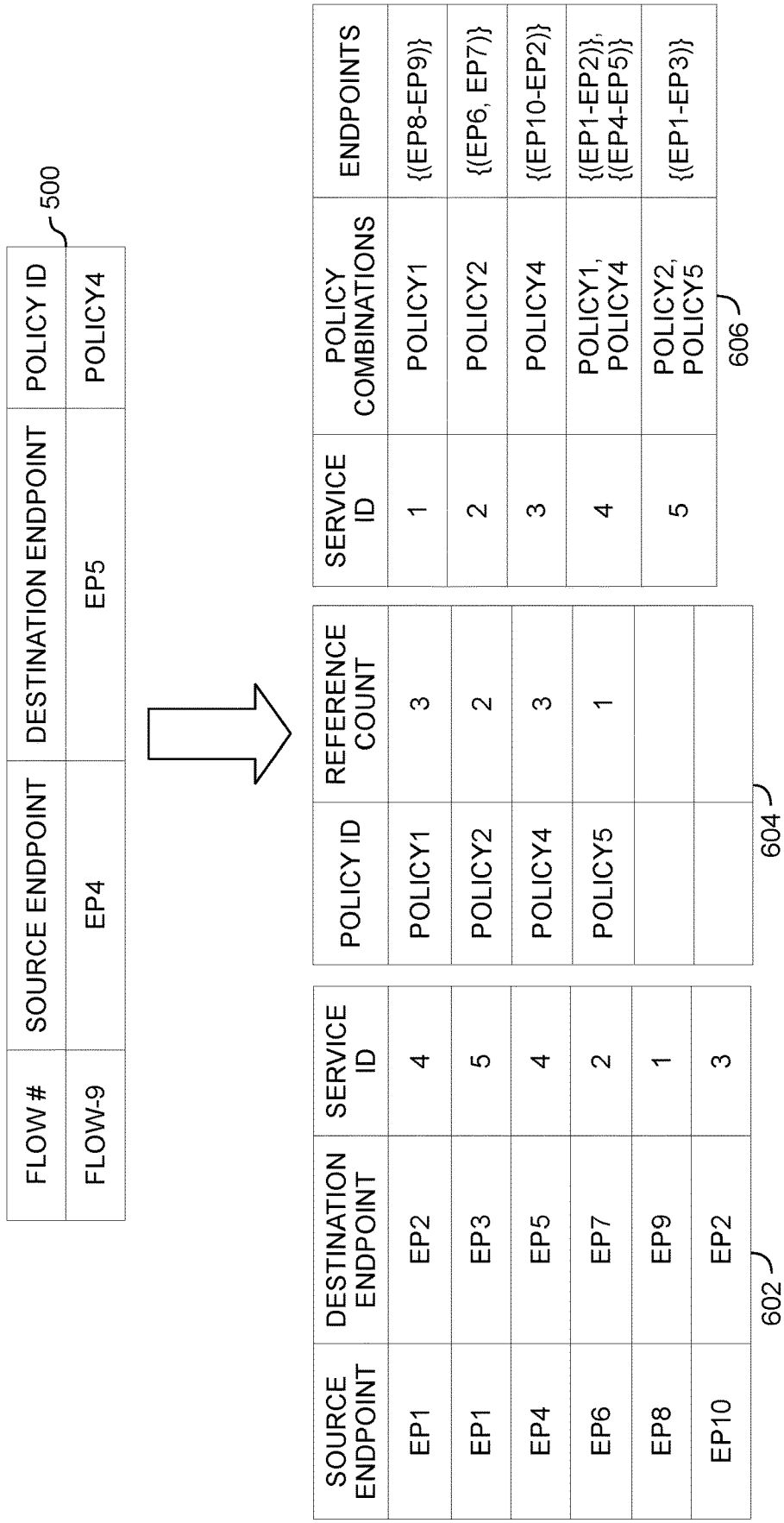

FIG. 6I illustrates this next flow: Flow-9, with source endpoint EP4, destination endpoint EP5, and policy identifier Policy4. At block 404, the policy consolidator determines that the endpoints in Flow-9 (e.g., EP4-EP5) are in the table 602, so the flowchart proceeds to block 410.

At block 410, the policy consolidator determines whether the policy identifier is already in Table_2 (e.g., table 604 illustrated in FIG. 6I). As illustrated in FIG. 6I, policy4 is in the table 604. So the flowchart proceeds to block 414. At block 414, the policy consolidator updates the row associated with policy4 to a reference count of 3.

At block 416, the policy consolidator determines whether the policy combination is already in Table_3. The policy combination (policy1, policy4) is in the table 606, so the flowchart proceeds to block 420. At block 420, the policy consolidator updates the row associated with (policy1, policy4), and service ID 4, to include the endpoints (EP4-EP5). Endpoint pair (EP4-EP5) is associated with both policy1 and policy4. So the policy consolidator removes endpoints (EP4-EP5) from the row in the table 606 associated with just policy1 (and service ID 1) when it adds endpoints (EP4-EP5) to the row associated with both policy1 and policy4 (and service ID 4). At block 422, the policy consolidator updates the service ID associated with the endpoints in the table 602, if necessary, based on the service ID used in the table 606. Flow-9 is again not the last flow, so the policy consolidator returns to block 402 and selects the next flow.

Figure 6J:
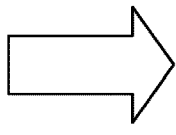

FIG. 6J illustrates this next flow: Flow-10, with source endpoint EP6, destination endpoint EP7, and policy identifier Policy5. At block 404, the policy consolidator determines that the endpoints in Flow-10 (e.g., EP6-EP7) are in the table 602, so the flowchart proceeds to block 410.

At block 410, the policy consolidator determines whether the policy identifier is already in Table_2 (e.g., table 604 illustrated in FIG. 6J). As illustrated in FIG. 6J, policy5 is in the table 604. So the flowchart proceeds to block 414. At block 414, the policy consolidator updates the row associated with policy5 to a reference count of 2.

At block 416, the policy consolidator determines whether the policy combination is already in Table_3. The policy combination (policy2, policy5) is in the table 606, so the flowchart proceeds to block 420. At block 420, the policy consolidator updates the row associated with (policy2, policy5), and service ID 5, to include the endpoints (EP6-EP7). Endpoint pair (EP6-EP7) is associated with both policy2 and policy5. So the policy consolidator removes endpoints (EP6-EP2) from the row in the table 606 associated with just policy2 (and service ID 2) when it adds endpoints (EP6-EP7) to the row associated with both policy2 and policy5 (and service ID 5). At block 422, the policy consolidator updates the service ID associated with the endpoints in the table 602, if necessary, based on the service ID used in the table 606. Flow-10 is again not the last flow, so the policy consolidator returns to block 402 and selects the next flow.

Figure 6K:
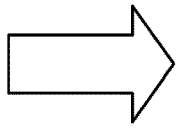

FIG. 6K illustrates this next flow: Flow-11, with source endpoint EP8, destination endpoint EP9, and policy identifier Policy6. At block 404, the policy consolidator determines that the endpoints in Flow-11 (e.g., EP8-EP9) are in the table 602, so the flowchart proceeds to block 410.

At block 410, the policy consolidator determines whether the policy identifier is already in Table_2 (e.g., table 604 illustrated in FIG. 6K). As illustrated in FIG. 6K, policy6 is not in the table 604. So the flowchart proceeds to block 412. At block 412, the policy consolidator adds a row for policy6, and sets the reference count to 1.

At block 416, the policy consolidator determines whether the policy combination is already in Table_3. The policy combination (policy1, policy6) is not in the table 606, so the flowchart proceeds to block 418. At block 418, the policy consolidator adds the policy combination (policy1, policy6) to the table 606. In an embodiment, as illustrated in FIG. 6K, the policy consolidator determines that policy1, alone, is in table 606 and associated with the endpoints (EP8-EP9) and service ID 1. Because endpoints (EP8-EP-9) are the only endpoints associated with policy1, alone, and these endpoints should now be associated with both policy1 and policy6, the policy consolidator updates the row associated with service ID 1 to include the combination (policy1, policy6), instead of policy1 alone (e.g., as illustrated in FIG. 6J, above). At block 422, the policy consolidator updates the service ID associated with the endpoints in the table 602, if necessary, based on the service ID used in the table 606. Flow-11 is again not the last flow, so the policy consolidator returns to block 402 and selects the next flow.

Figure 6L:
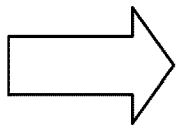

FIG. 6L illustrates this next flow: Flow-12, with source endpoint EP10, destination endpoint EP2, and policy identifier Policy6. At block 404, the policy consolidator determines that the endpoints in Flow-12 (e.g., EP10-EP2) are in the table 602, so the flowchart proceeds to block 410.

Figure 6M:
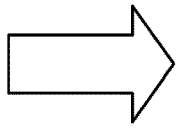

At block 410, the policy consolidator determines whether the policy identifier is already in Table_2 (e.g., table 604 illustrated in FIG. 6L). As illustrated in FIG. 6M, policy5 is in the table 604. So the flowchart proceeds to block 414. At block 414, the policy consolidator updates the row associated with policy6 to a reference count of 2.

At block 416, the policy consolidator determines whether the policy combination is already in Table_3. The policy combination (policy4, policy6) is not in the table 606, so the flowchart proceeds to block 418. At block 418, the policy consolidator adds the policy combination (policy4, policy6) to the table 606. In an embodiment, as illustrated in FIG. 6L, the policy consolidator determines that policy4, alone, is in table 606 and associated with the endpoints (EP10-EP2) and service ID 3. Because endpoints (EP10-EP-2) are the only endpoints associated with policy4, alone, and these endpoints should now be associated with both policy4 and policy6, the policy consolidator updates the row associated with service ID 3 to include the combination (policy4, policy6), instead of policy4 alone (e.g., as illustrated in FIG. 6K, above). At block 422, the policy consolidator updates the service ID associated with the endpoints in the table 602, if necessary, based on the service ID used in the table 606. Flow-12 is again not the last flow, so the policy consolidator returns to block 402 and selects the next flow.

FIG. 6M illustrates this next flow: Flow-13, with source endpoint EP1, destination endpoint EP2, and policy identifier Policy6. At block 404, the policy consolidator determines that the endpoints in Flow-13 (e.g., EP1-EP2) are in the table 602, so the flowchart proceeds to block 410.

At block 410, the policy consolidator determines whether the policy identifier is already in Table_2 (e.g., table 604 illustrated in FIG. 6M). As illustrated in FIG. 6M, policy6 is in the table 604. So the flowchart proceeds to block 414. At block 414, the policy consolidator updates the row associated with policy6 to a reference count of 3.

At block 416, the policy consolidator determines whether the policy combination is already in Table_3. The policy combination (policy1, policy4, policy6) is not in the table 606, so the flowchart proceeds to block 418. At block 418, the policy consolidator adds the policy combination (policy1, policy4, policy6) to the table 606, and associates it with service ID 6. Endpoint pair (EP1-EP2) is associated with all three of policy1, policy4, and policy6. So the policy consolidator removes endpoints (EP1-EP2) from the row in the table 606 associated with just policy1 and policy4 (and service ID 4) when it adds the new row with service ID 6, policy combination (policy1, policy4, policy6) and endpoints (EP1-EP2). At block 422, the policy consolidator updates the service ID associated with the endpoints in the table 602, if necessary, based on the service ID used in the table 606. Flow-13 is again not the last flow, so the policy consolidator returns to block 402 and selects the next flow.

Figure 6N:
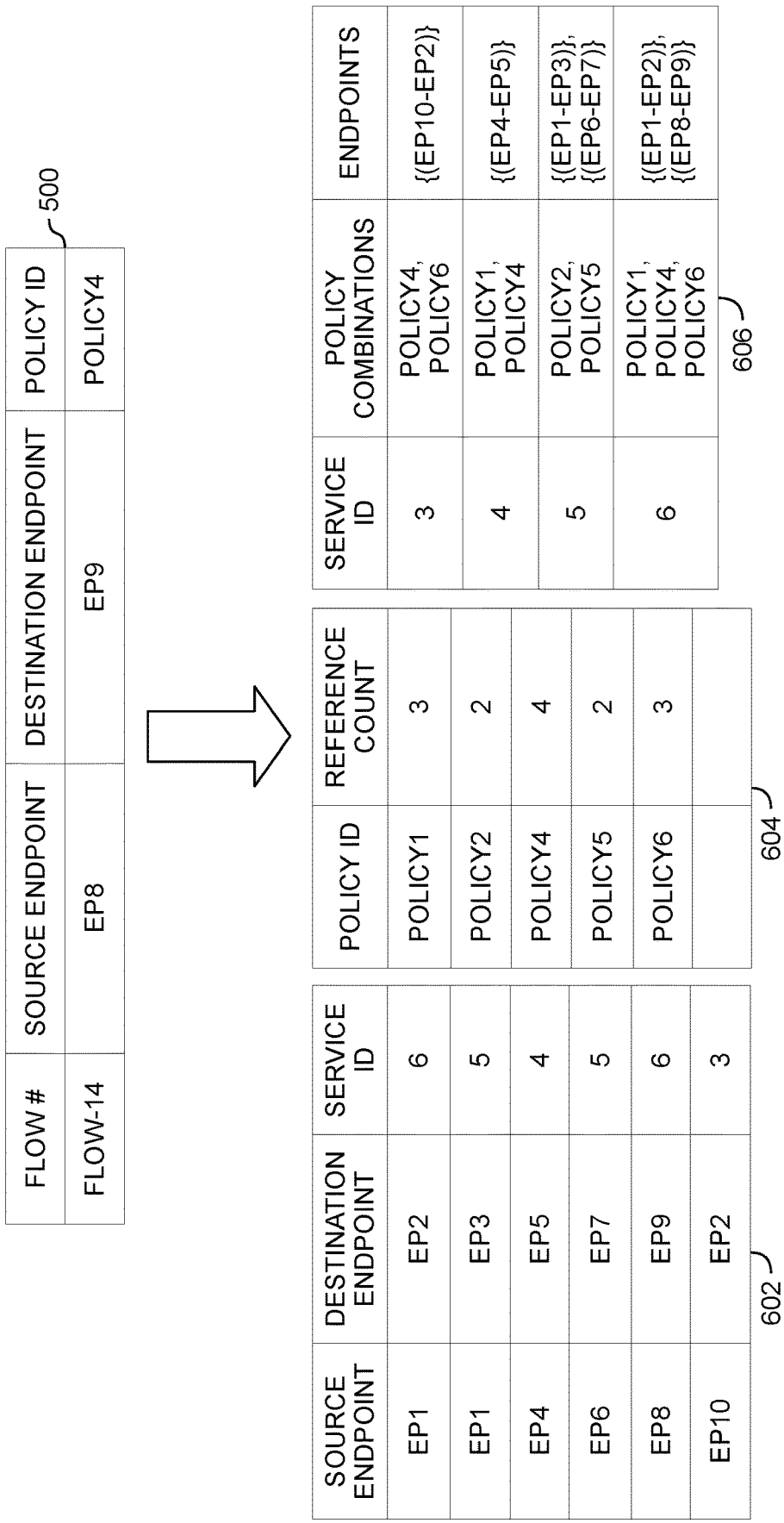
Figure 6O:
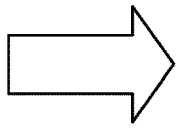

FIG. 6N illustrates this next flow: Flow-14, with source endpoint EP8, destination endpoint EP9, and policy identifier Policy4. At block 404, the policy consolidator determines that the endpoints in Flow-14 (e.g., EP8-EP9) are in the table 602, so the flowchart proceeds to block 410.

At block 410, the policy consolidator determines whether the policy identifier is already in Table_2 (e.g., table 604 illustrated in FIG. 6N). As illustrated in FIG. 6N, policy4 is in the table 604. So the flowchart proceeds to block 414. At block 414, the policy consolidator updates the row associated with policy4 to a reference count of 4.

At block 416, the policy consolidator determines whether the policy combination is already in Table_3. The policy combination (policy1, policy4, policy6) is in the table 606, so the flowchart proceeds to block 420. At block 420, the policy consolidator updates the row associated with policy combination (policy1, policy4, policy) and service ID 6 to includes endpoints (EP8-EP9). Endpoint pair (EP8-EP9) is associated with all three of policy1, policy4, and policy6. So the policy consolidator removes endpoints (EP8-EP9) from the row in the table 606 associated with just policy1 and policy6 (and service ID 1) when it adds the endpoints (EP8-EP9) to the row associated with service ID 6 and policy combination (policy1, policy4, policy6). At block 422, the policy consolidator updates the service ID associated with the endpoints in the table 602, if necessary, based on the service ID used in the table 606. Flow-14 is again not the last flow, so the policy consolidator returns to block 402 and selects the next flow.

FIG. 6O illustrates this next flow: Flow-15, with source endpoint EP4, destination endpoint EP5, and policy identifier Policy6. At block 404, the policy consolidator determines that the endpoints in Flow-15 (e.g., EP4-EP5) are in the table 602, so the flowchart proceeds to block 410.

At block 410, the policy consolidator determines whether the policy identifier is already in Table_2 (e.g., table 604 illustrated in FIG. 6O). As illustrated in FIG. 6O, policy6 is in the table 604. So the flowchart proceeds to block 414. At block 414, the policy consolidator updates the row associated with policy6 to a reference count of 3.

At block 416, the policy consolidator determines whether the policy combination is already in Table_3. The policy combination (policy1, policy4, policy6) is in the table 606, so the flowchart proceeds to block 420. At block 420, the policy consolidator updates the row associated with policy combination (policy1, policy4, policy) and service ID 6 to includes endpoints (EP4-EP5). Endpoint pair (EP4-EP5) is associated with all three of policy1, policy4, and policy6. So the policy consolidator removes endpoints (EP4-EP5) from the row in the table 606 associated with just policy1 and policy4 (and service ID 4) when it adds the endpoints (EP4-EP5) to the row associated with service ID 6 and policy combination (policy1, policy4, policy6). At block 422, the policy consolidator updates the service ID associated with the endpoints in the table 602, if necessary, based on the service ID used in the table 606. Flow-15 is, finally, the last flow so the flowchart in FIG. 4 ends.

Figure 7:
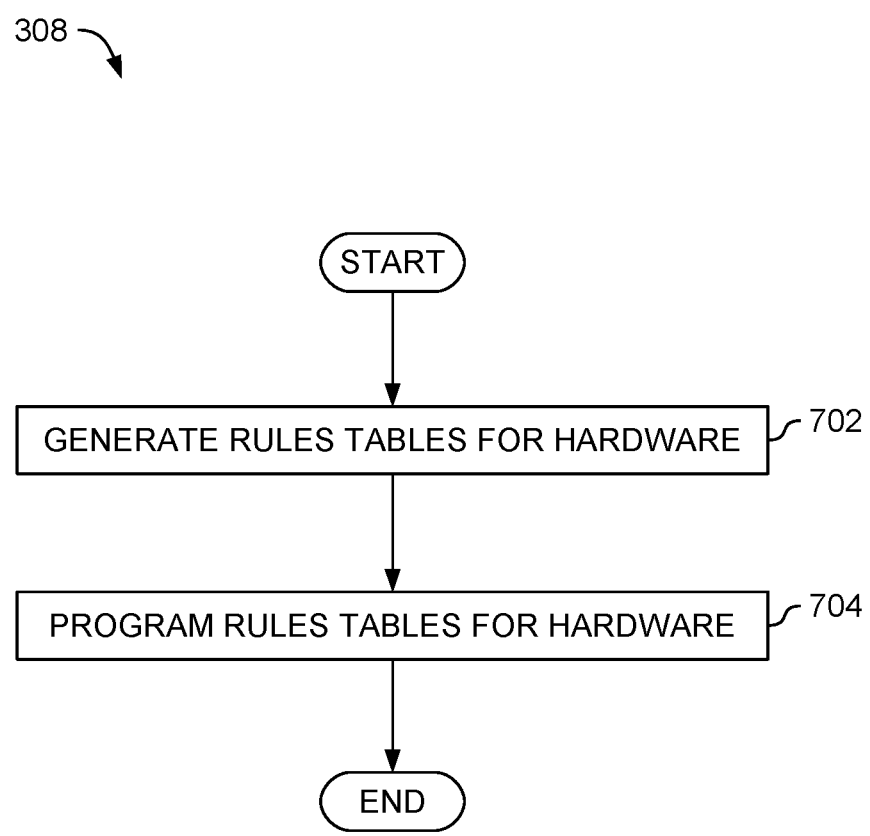
FIG. 7 is a flowchart illustrating programming consolidated whitelist rules in a leaf switch, according to one embodiment described herein.
Figure 8:
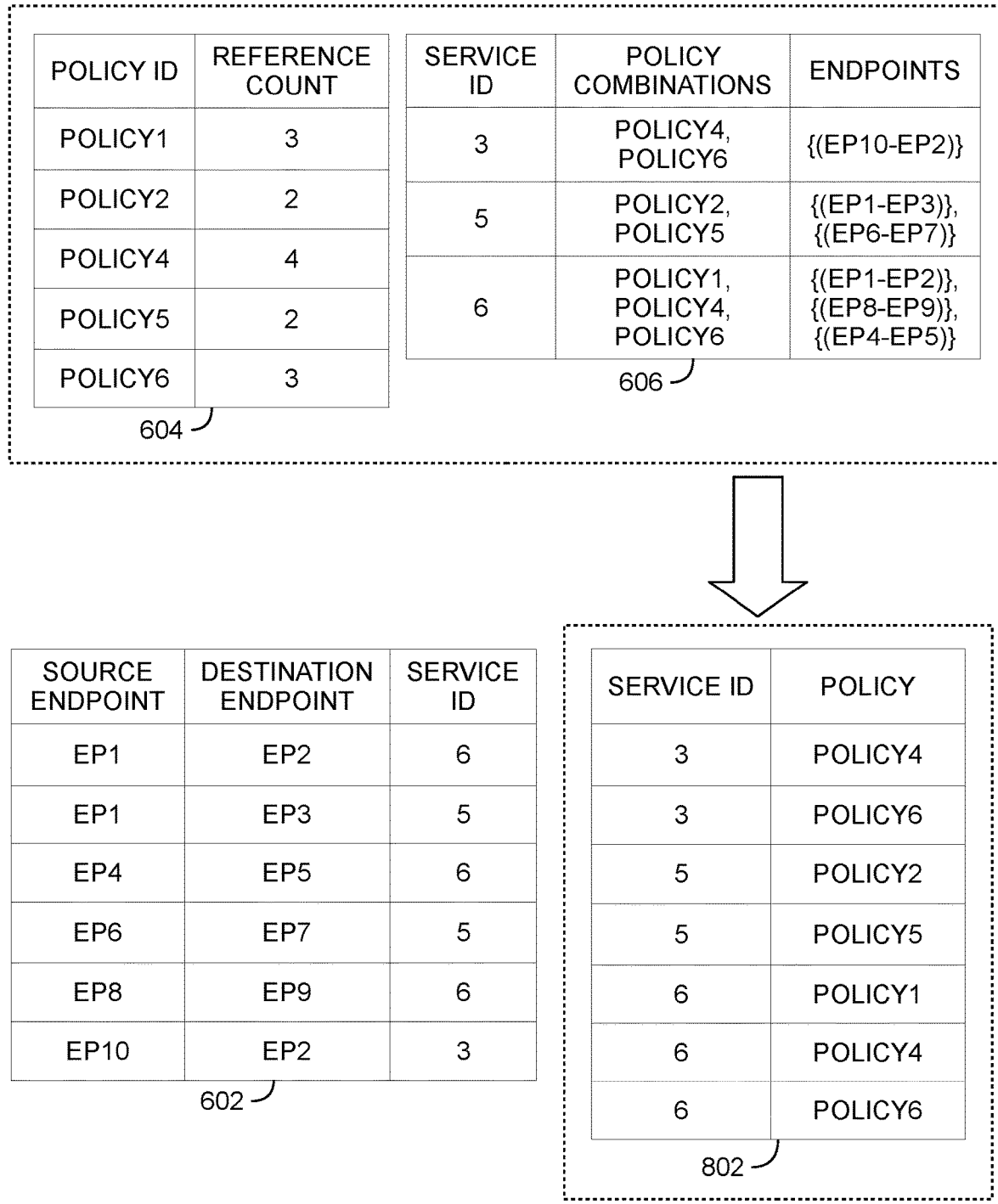
FIG. 8 illustrates programming consolidated whitelist rules in a leaf switch, according to one embodiment described herein.

FIG. 7 is a flowchart illustrating programming consolidated whitelist rules in a leaf switch, according to one embodiment described herein. FIG. 8 illustrates programming consolidated whitelist rules in a leaf switch, according to one embodiment described herein. These Figures will be discussed together.

At block 702 a policy consolidator (e.g., policy consolidator 212 illustrated in FIG. 2) generates rules tables for hardware. For example, as illustrated in FIG. 8, the policy consolidator generates table 802 from tables 604 and 606. The table 802 includes a row for each policy and service ID combination included in tables 604 and 606. For example, service ID 3 is tied to policy4 and policy6. A flow associated with service ID 3 should, therefore, implement both policy4 and policy6. The table 802 includes a row associating service ID 3 with policy4, and a row associating service ID 3 with policy6. Likewise, service ID 5 is associated with policy2 and policy5. And service ID 6 is associated with policy1, policy4, and policy6.

At block 704, the policy consolidator programs the rules table in the hardware (e.g., into the rule enforcement components 230 in the switch 122). In an embodiment, the policy consolidator programs table 602 and table 802, as illustrated in FIG. 8, into the hardware. Using these tables, the switch (e.g., the switch 122) can apply the appropriate policy for each endpoint combination. The switch can lookup a service ID associated with the endpoint combination, using table 602, and can then identify the policies associated with that service ID using the table 802.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, the embodiments disclosed herein may be embodied as a system, method or computer program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a computer program product embodied in one or more computer readable medium(s) having computer readable program code embodied thereon.

Program code embodied on a computer readable medium may be transmitted using any appropriate medium, including but not limited to wireless, wireline, optical fiber cable, RF, etc., or any suitable combination of the foregoing.

Computer program code for carrying out operations for embodiments of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatuses (systems), and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block(s) of the flowchart illustrations and/or block diagrams.

These computer program instructions may also be stored in a computer readable medium that can direct a computer, other programmable data processing apparatus, or other device to function in a particular manner, such that the instructions stored in the computer readable medium produce an article of manufacture including instructions which implement the function/act specified in the block(s) of the flowchart illustrations and/or block diagrams.

The computer program instructions may also be loaded onto a computer, other programmable data processing apparatus, or other device to cause a series of operational steps to be performed on the computer, other programmable apparatus or other device to produce a computer implemented process such that the instructions which execute on the computer, other programmable data processing apparatus, or other device provide processes for implementing the functions/acts specified in the block(s) of the flowchart illustrations and/or block diagrams.

The flowchart illustrations and block diagrams in the Figures illustrate the architecture, functionality, and operation of possible implementations of systems, methods, and computer program products according to various embodiments. In this regard, each block in the flowchart illustrations or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In view of the foregoing, the scope of the present disclosure is determined by the claims that follow.

We claim:

1. A computerized method for generating whitelist policies in a communication network, comprising:
   identifying a first plurality of whitelist policies for the communication network, each whitelist policy describing a security rule governing traffic between a pair of endpoints in the communication network and comprising the pair of endpoints and a policy identifier identifying the rule governing traffic between the pair of endpoints;
   replacing the first plurality of whitelist policies with a second plurality of whitelist policies, the second plurality of whitelist policies describing the same security rules for the same endpoints as the first plurality of whitelist policies, using fewer whitelist policies than the first plurality of whitelist policies, the replacing based on populating a plurality of tables using the first plurality of whitelist policies comprising:
      dividing the first plurality of whitelist policies across a first table and a second table, comprising:
         including each pair of endpoints in the first plurality of whitelist policies in the first table and associating each pair of endpoints with a respective service identifier in the first table; and
         including each respective service identifier in the second table, and associating the service identifiers with the respective policy identifiers for the first plurality of whitelist policies, wherein the first table does not include the policy identifiers and the second table does not include the pairs of endpoints;

programming the second plurality of whitelist policies into a network device in the communication network, based on at least one of the plurality of tables; and enforcing the rules governing traffic between the pair of endpoints, at the network device, using the programmed second plurality of whitelist policies.

2. The method of claim 1, wherein the network device is a network routing device and wherein the replacing the first plurality of whitelist policies is performed on the network routing device.

3. The method of claim 2, wherein the network routing device is a leaf switch.

4. The method of claim 3, wherein the second plurality of whitelist policies are programmed into a memory associated with hardware on the leaf switch, and wherein the hardware is used to enforce the rules.

5. The method of claim 1, wherein the network device comprises a virtual switch, wherein the second plurality of whitelist policies are programmed into a memory relating to the virtual switch, and wherein software relating to the virtual switch is used to enforce the rules.

6. The method of claim 1, wherein the first plurality of whitelist policies are generated automatically using an orchestration server for a data center.

7. The method of claim 1, wherein populating the plurality of tables comprises:

selecting a first whitelist policy of the first plurality of whitelist policies; and determining that a first pair of endpoints associated with the first whitelist policy is not included in the first table, and in response adding an entry to the first table including the first pair of endpoints and a first service identifier.

8. The method of claim 7, wherein populating the plurality of tables further comprises:

determining that a first policy identifier associated with the first whitelist policy is not included in a third table of the plurality of tables, and in response adding the first policy identifier to the third table; and adding an entry to a fourth table associating the first policy identifier with the first service identifier and the first pair of endpoints.

9. The method of claim 8, wherein populating the plurality of tables further comprises:

selecting a second whitelist policy of the first plurality of whitelist policies;

determining that the second whitelist policy relates to the first pair of endpoints and a second policy identifier; and in response updating the entry in the fourth table relating to the first pair of endpoints to associate the first pair of endpoints with both the first policy identifier and the second policy identifier.

10. The method of claim 7, wherein populating the plurality of tables further comprises:

selecting a second whitelist policy of the first plurality of whitelist policies, the second whitelist policy relating to a second pair of endpoints; and determining that the second pair of endpoints is included in the first table, and in response updating a second entry in the first table relating to the second pair of endpoints.

11. A system, comprising:

a hardware processor; and a memory containing computer program code that, when executed by the hardware processor, performs an operation comprising:

identifying a first plurality of whitelist policies for a communication network, each whitelist policy describing a security rule governing traffic between a pair of endpoints in the communication network and comprising the pair of endpoints and a policy identifier identifying the rule governing traffic between the pair of endpoints;

replacing the first plurality of whitelist policies with a second plurality of whitelist policies, the second plurality of whitelist policies describing the same security rules for the same endpoints as the first plurality of whitelist policies, using fewer whitelist policies than the first plurality of whitelist policies, the replacing based on populating a plurality of tables using the first plurality of whitelist policies comprising:

dividing the first plurality of whitelist policies across a first table and a second table, comprising:

including each pair of endpoints in the first plurality of whitelist policies in the first table and associating each pair of endpoints with a respective service identifier in the first table; and including each respective service identifier in the second table, and associating the service identifiers with the respective policy identifiers for the first plurality of whitelist policies, wherein the first table does not include the policy identifiers and the second table does not include the pairs of endpoints;

programming the second plurality of whitelist policies into a network device in the communication network, based on at least one of the plurality of tables; and enforcing the rules governing traffic between the pair of endpoints, at the network device, using the programmed second plurality of whitelist policies.

12. The system of claim 11, wherein the network device is a network routing device and wherein the replacing the first plurality of whitelist policies is performed on the network routing device.

13. The system of claim 11, wherein the network device comprises a virtual switch, wherein the second plurality of whitelist policies are programmed into a memory relating to the virtual switch, and wherein software relating to the virtual switch is used to enforce the rules.

14. The system of claim 11, wherein the first plurality of whitelist policies are generated automatically using an orchestration server for a data center.

15. The system of claim 11, wherein populating the plurality of tables comprises:

selecting a first whitelist policy of the first plurality of whitelist policies; and determining that a first pair of endpoints associated with the first whitelist policy is not included in the first table, and in response adding an entry to the first table including the first pair of endpoints and a first service identifier.

16. The system of claim 15, wherein populating the plurality of tables further comprises:

selecting a second whitelist policy of the first plurality of whitelist policies, the second whitelist policy relating to a second pair of endpoints; and determining that the second pair of endpoints is included in the first table, and in response updating a second entry in the first table relating to the second pair of endpoints.

17. A non-transitory computer-readable medium containing computer program code that, when executed by operation of one or more computer processors, performs an operation comprising:

identifying a first plurality of whitelist policies for a communication network, each whitelist policy describing a security rule governing traffic between a pair of endpoints in the communication network and comprising the pair of endpoints and a policy identifier identifying the rule governing traffic between the pair of endpoints;

replacing the first plurality of whitelist policies with a second plurality of whitelist policies, the second plurality of whitelist policies describing the same security rules for the same endpoints as the first plurality of whitelist policies, using fewer whitelist policies than the first plurality of whitelist policies, the replacing based on populating a plurality of tables using the first plurality of whitelist policies comprising:

dividing the first plurality of whitelist policies across a first table and a second table, comprising:

including each pair of endpoints in the first plurality of whitelist policies in the first table and associating each pair of endpoints with a respective service identifier in the first table; and including each respective service identifier in the second table, and associating the service identifiers with the respective policy identifiers for the first plurality of whitelist policies, wherein the first table does not include the policy identifiers and the second table does not include the pairs of endpoints;

programming the second plurality of whitelist policies into a network device in the communication network, based on at least one of the plurality of tables; and enforcing the rules governing traffic between the pair of endpoints, at the network device, using the programmed second plurality of whitelist policies.

18. The computer-readable medium of claim 17, wherein the network device is a network routing device and wherein the replacing the first plurality of whitelist policies is performed on the network routing device.

19. The computer-readable medium of claim 17, wherein the network device comprises a virtual switch, wherein the second plurality of whitelist policies are programmed into a memory relating to the virtual switch, and wherein software relating to the virtual switch is used to enforce the rules.

20. The computer-readable medium of claim 17, wherein populating the plurality of tables comprises:

selecting a first whitelist policy of the first plurality of whitelist policies;

determining that a first pair of endpoints associated with the first whitelist policy is not included in the first table, and in response adding an entry to the first table including the first pair of endpoints and a first service identifier;

selecting a second whitelist policy of the first plurality of whitelist policies, the second whitelist policy relating to a second pair of endpoints; and determining that the second pair of endpoints is included in the first table, and in response updating a second entry in the first table relating to the second pair of endpoints.

\* \* \* \* \*